(12) United States Patent
Hellbergh

(10) Patent No.: US 6,269,722 B1
(45) Date of Patent: Aug. 7, 2001

(54) TOOTH ARRANGEMENT IN A METAL CUTTING BANDSAW

(75) Inventor: Håkan Hellbergh, Branford, CT (US)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 09/104,391

(22) Filed: Jun. 25, 1998

(30) Foreign Application Priority Data

Jun. 26, 1997 (SE) .................................. 9702459

(51) Int. Cl.$^7$ .................. B23D 61/12; B27B 33/06
(52) U.S. Cl. .................. 83/661; 83/847; 83/848; 83/851
(58) Field of Search ............... 83/661, 848, 849, 83/850, 851, 835, 846, 847, 852, 853, 854, 855; 76/112

(56) References Cited

U.S. PATENT DOCUMENTS

| | | | |
|---|---|---|---|
| 2,637,355 | * 5/1953 | Chapin | 83/850 |
| 3,292,674 | * 12/1966 | Turner | 83/848 |
| 4,727,788 | 3/1988 | Yoshida et al. | 83/848 |
| 4,813,324 | * 3/1989 | Yoshida et al. | 83/848 |
| 4,958,546 | * 9/1990 | Yoshida et al. | 83/848 |
| 5,331,876 | * 7/1994 | Hayden, Sr. | 83/661 |
| 5,832,803 | * 11/1998 | Hayden, Sr. | 83/661 |

* cited by examiner

*Primary Examiner*—Clark F. Dexter
(74) *Attorney, Agent, or Firm*—Burns, Doane, Swecker & Mathis, L.L.P.

(57) ABSTRACT

A metal cutting bandsaw blade includes a strip and a recurring group of teeth projecting therefrom. The recurring group of teeth has a setting pattern and a height pattern. The setting pattern has at least three units selected from the following setting types:

(a) unset teeth
(b) teeth set to the right
(c) teeth set to the left.

The setting pattern includes at least one of each of the setting types. The height pattern has at least two selected from the following height types:

(a) high teeth
(b) low teeth.

The height pattern includes at least one of each of the height types. The total number of teeth in the recurring group is the product of the number of setting units and the number of heights units. The number of setting units is incommensurable with the number of height units. The number of teeth set to the right in the recurring group is equal to the number of teeth set to the left. All of the set teeth in the group have substantially equal setting widths.

4 Claims, 1 Drawing Sheet

TOOTH ARRANGEMENT IN A METAL CUTTING BANDSAW

BACKGROUND OF THE INVENTION

The present invention relates to a metal cutting bandsaw blade, and especially to an arrangement of teeth thereof. Bandsaws have long been used for cutting hard materials such as metal bars or profiles, their main advantage being that they can be made thinner than circular saws, thus wasting less material. Metal cutting bandsaw blades have some disadvantages that have restricted their use, however, since they tend to lose their torsional stiffness when the feed force is high. Many tooth shapes arrangements have been suggested with the purpose of reducing the feed force and any force components that might twist the blade. Well known among such tooth arrangements include having some teeth straight and longer than others to guide the tooth edge laterally, and letting teeth with unequal edge shapes cut thick but narrow chips known as the "triple chip" arrangement.

Lateral forces on the toothed edge of the bandsaw may be minimized if teeth that are subjected to large lateral forces are arranged in pairs with opposite setting. If the spacing between the teeth of the pair is small enough they will both be in the cut most of the time, and their individual lateral forces will cancel each other. However, if that spacing is small, then a larger number of teeth will be cutting simultaneously, leading to an undesirably large feed force when cutting solid sections, or a small depth of cut for each tooth, which is inefficient and produces excessive wear.

Another problem is the low in-plane stiffness for resisting feed forces acting in unison, with a great risk of vibration occurring if many teeth at equal spacing are cutting, causing chattering, noise and corrugations in the cut metal surfaces. On the other hand, if few teeth are cutting, the lateral forces will not cancel each other.

These problems make it difficult to design an optimal bandsaw even for a well defined metal cutting task, and even more so if the bandsaw is to be used for a variety of tasks involving metals of different thickness and metal types.

Numerous tooth arrangements have been suggested and tried in order to make a metal cutting bandsaw able to produce good surfaces in a variety of conditions. Differences in tooth height are used not only for lateral guidance, but also to let a few longer teeth do most of the cutting in hard materials still with a reasonable cutting depth. Differences in tooth spacing (pitch) are used to avoid chattering and to locate teeth in pairs without having too many teeth cutting at the same time. Differences in setting patterns are used to divide the kerf width into narrow chips with better thickness and controlled chip curling. But five or more teeth in the pattern may also occur, where lower (shorter) teeth have larger set widths than higher (taller) teeth.

For rational production, the teeth should be arranged in recurrent groups, corresponding to the widths of grinding, milling and setting tools. However, since it has been traditional to establish the setting of all teeth in the recurrent group simultaneously, very long recurrent groups require large tools, large machines and large machining forces.

Many suggested tooth arrangements, such as in Yoshida et al. U.S. Pat. No. 4,727,788 include all three of the above-discussed variations, i.e. variations in height, spacing (pitch), and setting, but are complicated and costly to manufacture.

It is an object of the invention to provide tooth arrangement for metal cutting bandsaw blades which causes less vibration than previously known designs, and which still is simple to manufacture with adequate precision.

BRIEF DESCRIPTION OF THE DRAWING

The objects and advantages of the invention will become apparent from the following detailed description of a preferred embodiment thereof in connection with the accompanying drawing in which like numerals designate like elements, and in which.

SUMMARY OF INVENTION

Traditionally, the first operation in the manufacture of a bandsaw blade is the cutting of teeth in the edge of a steel strip by conventional milling, grinding or blanking with the teeth being given the same or different height and the same or different pitch. According to the present invention, different height is important, whereas different pitch is optional and depends upon the materials being cut. If the steel strip is made of two alloys, as is commonly the case, the tips of the teeth would be formed of a harder alloy such as high-speed steel, while the body and back of the strip would be made of a tough crack-resistant steel alloy. In many cases, however, tips of tungsten carbide are welded onto the teeth, to get even higher hardness. The teeth would then set by knocking or pressing them to either side, or leaving some unset. Many conventional setting patterns include teeth set to different width which is very difficult to achieve in practice, but according to the present invention only one setting width is used. Many conventional tooth patterns which combine different tooth heights, pitches and setting widths comprise a large number of teeth in a recurrent group, which is one reason why it is difficult to perform the setting with high precision, and also requires more expensive tooling.

According to the present invention, the recurrent group is characterized by the combination of a height pattern (or subgroup) and a setting pattern (or subgroup), where the patterns have a different number of members or units. The number of teeth in the recurrent group will be the product of the members of the two patterns.

More particularly, the present invention pertains to a metal cutting bandsaw blade comprising a strip and a recurring group of teeth projecting therefrom. The recurring group of teeth has a setting pattern and a height pattern. The setting pattern comprises at least three setting units selected from the following setting types:

(a) unset teeth (b) teeth set to the right (c) teeth set to the left.

The setting pattern includes at least one of each of the setting types. The height pattern has at least two units selected from the following height types:

(a) high teeth (b) low teeth

The height pattern includes at least one of each of the height types. The total number of teeth in the recurring group is the product of the number of setting units and the number of height units. The number of setting units is incommensurable with the number of height units. A number of teeth set to the right in the group is equal to a number of teeth set to the left in the group. All of the set teeth in the group have substantially equal setting widths.

DETAILED DESCRIPTION OF A PREFERRED EMBODIMENT OF THE INVENTION

Figure 1:
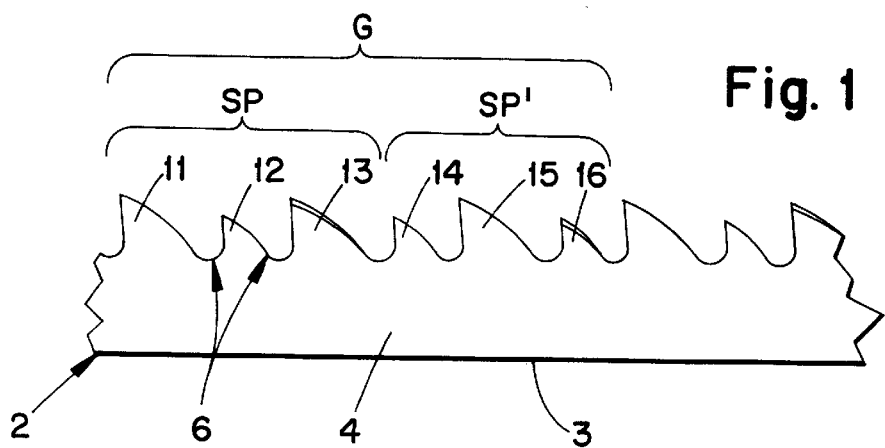
FIG. 1 shows a bandsaw blade from the side.
Figure 2:
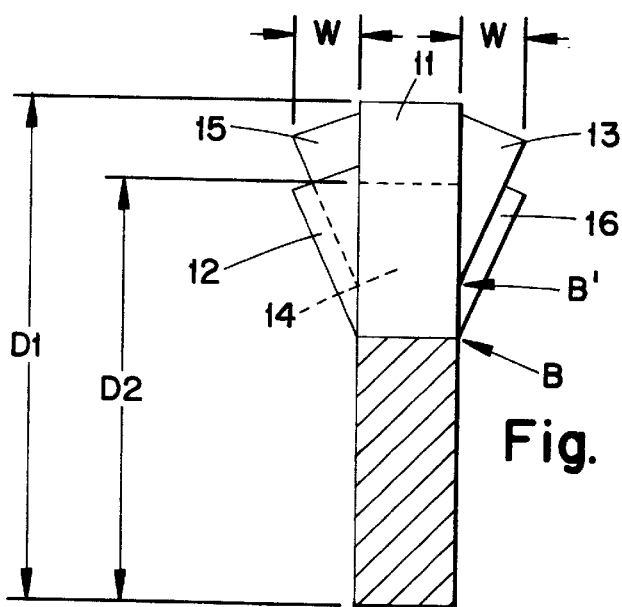
FIG. 2 is a cross-section through the blade of FIG. 1.
Figure 3:
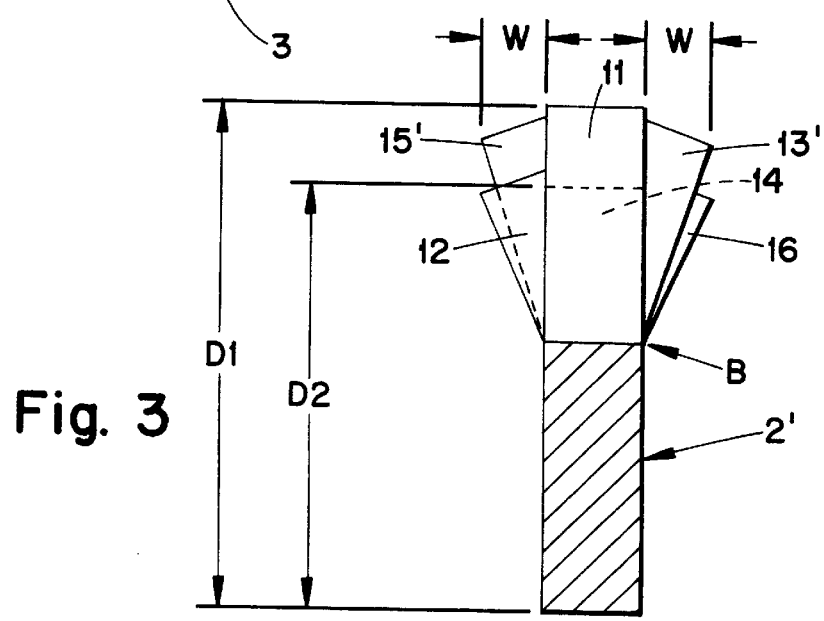
FIG. 3 is a cross section through another blade embodiment.

One embodiment of a metal cutting bandsaw blade (2) includes a steel strip (4) from which a recurring group G of teeth projects, successive teeth in the group being separated by roots (6). The teeth of the group G are characterized by a setting pattern SP which is repeated at least once within the group as will be later explained. The setting pattern SP can comprise any number of teeth as long as there are at least three teeth in the pattern. FIGS. 1–3 depict a setting pattern SP consisting of three teeth (11, 12 and 13 or 13') which is repeated once in the form of a setting pattern SP' consisting of three teeth (14, 15 or 15', 16). The teeth of the setting pattern are selected from the following three setting types:

(a) unset teeth (hereinafter designated "O")
(b) teeth set to the right (hereinafter designated "R")
(c) teeth set to the left (hereinafter designated "L").

The setting pattern must include at least one of each of those setting types. The number of teeth set to the right must equal the number set to the left. All of the set teeth must be set to substantially the same setting width W.

Thus, one setting pattern could be a three-unit pattern O-R-L (i.e., an unset tooth followed by a tooth set to the right, followed by a tooth set to the left); another setting pattern could be a five-unit pattern O-R-L-R-L.

In addition to a setting pattern, the teeth of each recurring group have a height pattern or subgroups. The teeth of the height pattern are selected from the following two height types:

(a) high teeth ("H") having a height D1
(b) low teeth ("L") having a height D2

The tooth height is measured from the back edge (3) to the tip of the tooth prior to the performing of any setting operation. Thus, the high set teeth and high unset teeth will have substantially the same height D1, and the low set teeth and low unset teeth will have substantially the same height D2. The height D2 is less than the height D1, preferably by an amount in the range of 0.075 to 0.15 mm, with 0.1 mm being a suitable difference in height. The height pattern must include at least one high tooth H and at least one low tooth L. Thus, one height pattern could be a two-digit pattern H-L, or a three digit pattern HLL, for example.

By "substantially the same" as used herein to describe the set widths and tooth heights is meant that an attempt is made to make the particular dimension (i.e. setting width or tooth height), the same and any difference involves only the usual manufacturing tolerances.

The total number of teeth in the recurring group is the product of the number of units in the setting pattern and the number of units in the height pattern, (i.e. setting pattern units multiplied by height pattern units). However, the number of units in the setting pattern must be incommensurable with the number of units in the height pattern. By "incommensurable" is meant that the ratio of the two numbers is irrational, i.e., neither number can be divided into the other by an integer (i.e., a whole number). Thus, for example, if there are three units in the setting pattern, the height pattern can have two, four, five, seven, or eight units, but cannot have three, six or nine units.

From the foregoing, it will be appreciated that the blade depicted in FIGS. 1–3, having a setting pattern of O-R-L and a height pattern of H-L will have six teeth in the group G (i.e., the product of three times two) and the recurring group can be characterized as follows:

| tooth number | 1 | 2 | 3 | 4 | 5 | 6 |
|---|---|---|---|---|---|---|
| height | H | L | H | L | H | L |
| setting | O | R | L | O | R | L |

Thus, the group would consist of the following successively arranged six teeth:

1. HO (a high unset tooth 11)
2. LR (a low tooth 12 set to the right)
3. HL (a high tooth 13 or 13' set to the left)
4. LO (a low unset tooth 14)
5. HR (a high tooth 15 or 15' set to the right)
6. LL (a low tooth 16 set to the left)

In another possible embodiment of the invention, not shown, there could be a five-unit setting pattern of O-R-L-R-L, and a two-unit height pattern H-L, whereby there would be a total of ten teeth in the recurring group, characterized as follows:

| tooth number | 1 | 2 | 3 | 4 | 5 | 6 | 7 | 8 | 9 | 10 |
|---|---|---|---|---|---|---|---|---|---|---|
| height | H | L | H | L | H | L | H | L | H | L |
| setting | O | R | L | R | L | O | R | L | R | L |

That is, the recurring group G would consist of the following successively arranged ten teeth:

1. HO (high and unset)
2. LR (low-set to the right)
3. HL (high-set to the left)
4. LR (low-set to the right)
5. HL (high-set to the left)
6. LO (low and unset)
7. HR (high-set to the right)
8. LL (low-set to the left)
9. HR (high-set to the right)
10. LL (left-set to the left)

In another possible embodiment of the invention, not shown, there could be a five-unit setting pattern O-R-L-R-L and a three-unit height pattern H-L-L, whereby there would be a total of fifteen teeth in the recurring group, characterized as follows:

| tooth number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| height | H | L | L | H | L | L | H | L | L | H | L | L | H | L | L |
| setting | O | R | L | R | L | O | R | L | R | L | O | R | L | R | L |

That is, the recurring group G would consist of the following successively arranged fifteen teeth:

1. HO (high and unset)
2. LR (low-set to the right)
3. LL (low-set to the left)
4. HR (high-set to the right)
5. LL (low-set to the left)
6. LO (low and unset)
7. HR (high-set to the right)
8. LL (low-set to the left)
9. LR (low-set to the right)
10. HL (high-set to the left)
11. LO (low and unset)
12. LR (low-set to the right)
13. HL (high-set to the left)
14. LR (low-set to the right)
15. LL (low-setto the left)

The setting of the teeth can be performed in conventional ways. One way is to bend the teeth whereby all set teeth, including the high set teeth (e.g., teeth 13', 15'), are bent about axes located at the same elevation B, as shown in FIG. 3. Another way is to bend the teeth whereby the high set teeth (e.g., teeth 13, 15) are bent about axes located at an elevation B' which is higher than the elevation B at which the low set teeth (2, 16) are bent, as shown in FIG. 2. In either case, all of the set teeth have substantially the same setting width W as stated above.

When setting the teeth, only the teeth of the setting pattern SP are set simultaneously, in contrast to the traditional method of simultaneously setting the teeth of the entire recurring group. Thus, in connection with FIGS. 1–3, since only two of the teeth 12, 13 or 13' of the setting pattern SP are to be set, the setting machine would comprise two knocking members, one to set a tooth to the right, and another to set a tooth to the left. Those knocking members would be positioned to engage the teeth 12, 13 or 13' respectively. After the teeth 12, 13 or 13' have been set, the blade strip would be advanced, whereby the teeth 14–16 of the next setting pattern SP' would occupy the spaces previously occupied by the teeth 12–14, and the setting operation would be repeated, and so on.

To reiterate, FIG. 1 shows a part of a metal cutting bandsaw blade according to the invention having a long recurrent group G of six teeth (11–16). The group is the result of a tooth height pattern of two units, i.e., one high and one low (H-L), and a setting pattern of three teeth, one unset, one right and one left (O-R-L). The first tooth (11) in the group is high and unset, the second tooth (12) is low and set right, the third tooth (13 or 13') is high and set left, the fourth tooth (14) is low and unset, the fifth tooth (15 or 15') is high and set right, the sixth tooth (16) is low and set left. No two teeth in this group of six (HO-LR-HL-LO-HR-LL) have the same combination of height and setting, and each of the six possible combinations of the two height alternatives and three settings occurs once.

When cutting hard materials and large sections, only the high teeth (11) cut, and as they are located at equal heights, the saw blade will function as a blade with coarse but even pitch, with equal tooth loading and low vibration level, and the teeth will cut to adequate depth. There is, however, one great improvement, since according to the invention the low set teeth (12, 16) between the high teeth (13 or 13', 15 or 15') are set with the same setting width W as the high teeth. Those low set teeth will slide against the kerf sides without cutting, thereby stabilizing the saw blade laterally and suppressing any tendency for lateral vibrations to occur which would otherwise occur where a cutting tooth enters or leaves the kerf, and which would otherwise create copies of the workpiece contour lines.

In a tooth height group, the height difference (i.e., D1 minus D2) should be enough to avoid any cutting action by low set teeth when cutting hard materials, which for most saw dimensions means that the low teeth should be lower than the high teeth before setting, e.g. by 0.075–0.15 mm, preferably 0.1 m.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A metal cutting bandsaw blade comprising a strip and a recurring group of teeth projecting therefrom, each group of teeth having setting subgroups and height subgroups, each setting subgroup comprising at least three setting units selected from the following setting types:
   (a) unset teeth,
   (b) teeth set to the right,
   (c) teeth set to the left;

each setting subgroup defining a setting pattern and including at least one of each of the setting types, the setting pattern repeating itself at least once within the group;

each height subgroup comprising at least two height units selected from the following height types:
   (a) high,
   (b) low;

each height subgroup defining a height pattern and including at least one of each of the height types, the height pattern repeating itself at least once within the group, the high teeth being of substantially equal height, and the low teeth being of substantially equal height which is less than the height of the high teeth;

a total number of teeth in the recurring group being equal to the number of setting units multiplied by the number of height units, the number of setting units being incommensurable with the number of height units;

a number of teeth set to the right in the group being equal to a number of teeth set to the left in the group;

all of the set teeth in the setting subgroup having substantially equal setting widths.

2. The metal cutting bandsaw blade according to claim 1 wherein the recurring group has two height units and three setting units.

3. The metal cutting bandsaw blade according to claim 1 wherein a difference in height between the high teeth and the low teeth is in the range of 0.075 to 0.15 mm.

4. The metal cutting bandsaw blade according to claim 1 wherein a difference in height between the high teeth and the low teeth is about 0.1 mm.

* * * * *